2,996,511
PROCESS FOR THE PRODUCTION OF PYRIDINE CARBOXYLIC ACIDS

Ernst Stirnemann, Basel, and Wolfgang Moser and Simon Perl, Visp, Switzerland, assignors to Lonza Electric and Chemical Works Ltd., Basel, Switzerland
No Drawing. Filed Aug. 16, 1954, Ser. No. 450,206
Claims priority, application Switzerland Aug. 24, 1953
6 Claims. (Cl. 260—295.5)

The present invention relates to a process for the preparation of pyridine carboxylic acids by oxidising alkyl pyridine derivatives with nitric acid, and more especially to a process for the preparation of nicotinic acid, starting from 2-methyl-5-ethyl pyridine. Such processes have already been variously described. The oxidation has hitherto been carried out in the liquid phase, either in several stages or under pressure, if desired in the presence of sulphuric acid, phosphoric acid, hydrochloric acid, and catalysts, such as, for example, Hg, Cu or Se.

The novel feature of the process according to the invention is that the oxidation of the alkyl pyridine is carried out in the gaseous phase. For example, alpha collidine and nitric acid are mixed and vaporised, and then the vapours are caused to pass over catalyst surfaces, and the reaction mixture containing the nicotinic acid is collected at the bottom of the reaction vessel. As compared with an operation carried out in the liquid phase, this process has the advantage that it is possible to operate continuously and without using pressure. Furthermore, this process enables an apparatus of comparatively simple construction to be used.

The introduction of the reactants into the reaction vessel may be carried out in various ways. For example, the alkyl pyridine and nitric acid may be vaporised in admixture or separately. Moreover, depending on the constructional form of the reaction apparatus, the reaction components may be introduced in vaporised or liquid form, or even atomised form.

In order to carry the process according to the invention into effect, it is preferred to use nitric acid containing 10 to 70% by weight of $HNO_3$. The reaction temperature depends on the alkyl pyridine compound which is selected and may vary between 120° C. and 300° C., preferably between 210° C. and 280° C. For example, if it is desired to oxidise 2-methyl-5-ethyl pyridine according to the process of the invention to form nicotinic acid, the reaction is preferably carried out with 10 to 50% by weight of nitric acid at temperatures of 210° C. to 270° C. The catalysts employed in this embodiment may, for example, be $Fe_2O_3$, $V_2O_5$, CuO, $MoO_3$, $SeO_2$, or preferably $B_2O_3$, or mixtures of these oxides or also boric acid. $B_2O_3$, $SeO_2$ and boric acid have the advantage of subliming at temperatures such as are to be met with in the reaction process, and this not only causes constant renewal of the catalytic surface, but also permits of catalysis in the gaseous phase. The catalysts may be made available to the reaction in various ways, either by applying solid catalysts to carriers, or by introducing or injecting the catalysts in solid, liquid or gaseous form into the reaction vessel. However, it is also possible for the catalysts to be dissolved, for example in at least one of the starting substances or a mixture thereof and introduced with the latter, for example in vaporised form, to the reaction chamber. By cooling the mixture obtained after the reaction, there is obtained a mass containing the pyridine carboxylic acid.

Since the reaction is strongly exothermic, provision must be made for an adequate dissipation of heat; the excess heat of reaction may be used, for example, for vaporising and/or heating the starting substances. It has been found that the yield of pyridine carboxylic acid is to a large extent dependent on the constancy of the reaction temperature.

In the oxidation of pyridine compounds with nitric acid, the latter is partially reduced to nitrogen oxides, while another part of the nitric acid generally remains unchanged. Normally, only a very small fraction of the nitric acid or none at all is reduced to nitrogen. The gas mixture which remains after separating the pyridine carboxylic acid, and which consists mainly of nitrogen oxides, steam, unreduced nitric acid, carbon dioxide and nitrogen, is advantageously mixed with gases containing oxygen, so that the lower nitrogen oxides may be oxidised and worked up into nitric acid of relatively high concentration by washing the gases thus formed with water or a dilute nitric acid.

By suitable measures which are familiar to one skilled in the art, it is readily possible in this way to recover nitric acid in the concentration needed for the oxidation process, so that the said acid may be immediately returned to the reaction. It is possible in this manner to work with a minimum consumption of $HNO_3$, and this makes the complete process particularly economical.

For carrying the process into effect, there is advantageously employed an elongated reaction chamber, such as, for example, a tube, which is provided with heating and heat-dissipating means. The reaction chamber is formed so that one part thereof functions as a vaporiser and heater; however, it is also possible for the vaporiser and heater to be arranged in front of the reaction chamber proper. In certain cases, which are determined by the nature of the starting products, the conditions of the reaction and the catalyst, the reaction chamber may be packed, for example, with Raschig rings or with a granular substance to prevent laminar flow and to promote the mixing of the gases. In certain cases, these packings may also be used as the carrier for the catalyst. Pumice granules, for example, are also suitable as a packing. The reaction chamber is connected by way of a condenser to a collecting vessel which may be connected to a device for withdrawal of gas, so that the gases formed after the reaction may be withdrawn by suction. With relatively large apparatus, it is advantageous for the reaction apparatus to be made, for example, of two concentric tubes to provide for the necessary dissipation of heat; in this case the annular space between the tubes is either empty or filled with packing material and is utilised as the oxidation space, so that the heat of oxidation may be discharged inwardly as well as outwardly in order to keep the temperature as constant as possible. In addition to the oxidation of alpha collidine, which has been described, it is also possible for other alkyl pyridines, such as, for example, gamma-picoline or 2.4.6-trimethyl pyridine, to be oxidised with nitric acid to form the corresponding pyridine carboxylic acid.

Example 1

The reaction vessel consists of a vertical tube with a diameter of 4 cm. and a length of 100 cm., the said tube being packed with granulated pumice stone and provided with a heating jacket. At the upper end, a mixture of 1 part by weight of 2-methyl-5-ethyl pyridine with 20 parts by weight of 40% nitric acid and 0.06 part by weight of boric acid is introduced into the reaction tube at a reaction temperature of 230° C. The reactants are vaporised and brought to reaction temperature, and the reaction then proceeds. The mixture which is formed is cooled and collected at the bottom end of the tube. With an hourly input of 357 g. of mixture, 52 g. of nicotinic acid are recovered from the nitric acid solution per 100 g. of 2-methyl-5-ethyl pyridine used, which corresponds to a yield of 51%.

Example 2

Using the same reaction vessel as indicated in Example 1, a mixture of 1 part by weight of gamma-picoline with 18 parts by weight of 40% nitric acid and 0.06 part by weight of boric acid is introduced into the reaction tube at a reaction temperature of 240° C. The reactants are vaporised and brought to reaction temperature, and the reaction then proceeds. Isonicotinic acid was obtained in a yield of 51%.

Example 3

Using the reaction vessel according to Example 1, 1 part by weight of 2.4.6-trimethyl pyridine is introduced with 3 parts by weight of 30% nitric acid and 0.06 part by weight of boric acid into the reaction tube with the reaction temperature of 250° C. The reactants are vaporised and brought to reaction temperature, and the reaction then takes place. The 2.4.6-pyridine trimethyl carboxylic acid which is first produced is decarboxylated during the reaction to form isonicotinic acid, which was obtained in a yield of substantially 56%.

What we claim is:

1. A method of producing pyridine carboxylic acids, comprising the steps of reacting an alkyl pyridine in gaseous state with gaseous nitric acid at atmospheric pressure at a temperature between 210–300° C. in the presence of a catalyst adapted to activate oxidation of said alkyl pyridine by said nitric acid and being selected from the group consisting of iron oxide, vanadium oxide, copper oxide, molybdenum oxide, selenium oxide, boron oxide, boric acid and mixtures thereof so as to form the corresponding pyridine carboxylic acid; and recovering the thus formed pyridine carboxylic acid.

2. A method of producing pyridine carboxylic acids, comprising the steps of reacting an alkyl pyridine selected from the group consisting of 2-methyl-5-ethyl pyridine, alpha collidine, gamma picoline and 2,4,6-trimethyl pyridine in gaseous state with gaseous nitric acid having an $HNO_3$ concentration of between 10–70% at atmospheric pressure at a temperature between 210–300° C. in the presence of a catalyst adapted to activate oxidation of said alkyl pyridine by said nitric acid and being selected from the group consisting of iron oxide, vanadium oxide, copper oxide, molybdenum oxide, selenium oxide, boron oxide, boric acid and mixtures thereof so as to form the corresponding pyridine carboxylic acid; and recovering the thus formed pyridine carboxylic acid.

3. A method of producing pyridine carboxylic acids, comprising the steps of reacting 2-methyl-5-ethyl pyridine in gaseous state with gaseous nitric acid having an $HNO_3$ concentration of between 10–50% at atmospheric pressure at a temperature between 210–280° C. in the presence of boric acid so as to form the corresponding pyridine carboxylic acid; and recovering the thus formed pyridine carboxylic acid.

4. A method of producing pyridine carboxylic acids, comprising the steps of vaporizing a liquid alkyl pyridine selected from the group consisting of 2-methyl-5-ethyl pyridine, alpha collidine, gamma picoline and 2,4,6-trimethyl pyridine and liquid nitric acid of at least 10–70% concentration, at least one of said liquids having dissolved therein a catalyst adapted to activate oxidation of said alkyl pyridine by said nitric acid and being selected from the group consisting of iron oxide, vanadium oxide, copper oxide, molybdenum oxide, selenium oxide, boron oxide, boric acid and mixtures thereof, so as to form vapors of said alkyl pyridine, said nitric acid and said catalyst; reacting the thus formed vapors of said alkyl pyridine and said nitric acid in the presence of said vapors of said catalyst at atmospheric pressure at a temperature between 210–300° C. so as to form the corresponding pyridine carboxylic acid; and recovering the thus formed pyridine carboxylic acid.

5. A method of producing pyridine carboxylic acids, comprising the steps of reacting an alkyl pyridine of up to three alkyl groups each of up to two carbon atoms in gaseous state with gaseous nitric acid at atmospheric pressure at a temperature between 210–300° C. in the presence of a catalyst adapted to activate oxidation of said alkyl pyridine by said nitric acid and being selected from the group consisting of iron oxide, vanadium oxide, copper oxide, molybdenum oxide, selenium oxide, boron oxide, boric acid and mixtures thereof so as to form the corresponding pyridine carboxylic acid; and recovering the thus formed pyridine carboxylic acid.

6. A method of producing pyridine carboxylic acids, comprising the steps of reacting an alkyl pyridine selected from the group consisting of 2-methyl-5-ethyl pyridine, alpha collidine, gamma picoline and 2,4,6-trimethyl pyridine in gaseous state with gaseous nitric acid at atmospheric pressure at a temperature between 210–300° C. in the presence of a catalyst adapted to activate oxidation of said alkyl pyridine by said nitric acid and being selected from the group consisting of iron oxide, vanadium oxide, copper oxide, molybdenum oxide, selenium oxide, boron oxide, boric acid and mixtures thereof so as to form the corresponding pyridine carboxylic acid; and recovering the thus formed pyridine carboxylic acid.

References Cited in the file of this patent

UNITED STATES PATENTS

| | | |
|---|---|---|
| 2,394,650 | Zimmerli | Feb. 12, 1946 |
| 2,437,938 | Cislak et al. | Mar. 16, 1948 |
| 2,519,481 | Kubie et al. | Aug. 22, 1950 |
| 2,522,163 | Cislak et al. | Sept. 12, 1950 |
| 2,657,207 | Herring | Oct. 27, 1953 |
| 2,702,802 | Aries | Feb. 22, 1955 |
| 2,749,350 | Nowlin | June 5, 1956 |

FOREIGN PATENTS

| | | |
|---|---|---|
| 650,984 | Great Britain | Mar. 7, 1951 |
| 709,176 | Great Britain | May 19, 1954 |
| 892,871 | France | Jan. 17, 1944 |
| 1,054,523 | France | Oct. 7, 1953 |
| 1,059,475 | France | Nov. 10, 1953 |